United States Patent [19]  [11] 3,953,166
Pepperman, Jr. et al.  [45] Apr. 27, 1976

[54] FLAME RESISTANT ORGANIC TEXTILES THROUGH TREATMENT WITH PHENOLS AND ADDUCT POLYMERS

[75] Inventors: Armand B. Pepperman, Jr., Metairie; Donald J. Daigle, New Orleans; Sidney L. Vail, River Ridge, all of La.

[73] Assignee: The United States of America as represented by the Secretary of Agriculture, Washington, D.C.

[22] Filed: Aug. 22, 1974

[21] Appl. No.: 499,804

[52] U.S. Cl............................. 8/116 P; 106/15 FP; 252/8.1; 260/384; 260/606.5 P; 427/390; 428/921
[51] Int. Cl.$^2$.......................................... C08G 33/16
[58] Field of Search............... 8/116 P; 260/606.5 P, 260/384; 427/390; 428/921; 106/15 FP; 252/8.1

[56] References Cited
UNITED STATES PATENTS
3,787,360  1/1974  Daigle et al....................... 8/116 X Primary Examiner—Michael R. Lusignan
Attorney, Agent, or Firm—M. Howard Silverstein; Salvador J. Cangemi; Max D. Hensley

[57] ABSTRACT

Soluble adduct polymers were allowed to react with phenol, alkyl substituted phenols or halogen substituted phenols which contain one or more hydrogens ortho or para to the phenolic hydroxyl group to (a) prepare flame resistant polymers and (b) prepare flame-, glow-, wrinkle- and shrink-resistant woven and knit textiles which contain 25% or more cellulosic fibers.

2 Claims, No Drawings

FLAME RESISTANT ORGANIC TEXTILES THROUGH TREATMENT WITH PHENOLS AND ADDUCT POLYMERS

This invention relates to new phosphorus, nitrogen, and halogen containing polymers and to their use in the production of flame-resistant organic fibrous materials. More specifically, it deals with the reaction of adduct polymers with phenol or substituted phenols to produce insoluble polymers and flame-resistant organic fibrous products when these insoluble polymers are found in or on the fibrous materials.

As employed throughout the specifications and claims of this invention, the term "adduct polymer" refers to the product formed by solubilizing unoxidized phosphorus- and nitrogen-containing polymers in solutions containing formaldehyde and an acid. The chemistry involved in the solution of these polymers by the addition of formaldehyde and an acid is not known, but it is believed that chemical reactions occur which modify the polymers by altering the chain length and/or by addition of the reactants to the polymer or products therefrom.

The abbreviation THP refers to the compound tris (hydroxymethyl) phosphine, $(HOCH_3)P$. The term tetrakis (hydroxymethyl)phosphonium salt refers to that class of compounds in which four hydroxymethyl groups are bonded to a phosphorus atom which is in the phosphonium state, thus having a plus charge associated with it and the anion can be the anion of any organic or inorganic acid such as acetic, oxalic hydrochloric or phosphoric. The abbreviation Thpc refers to the compound tetrakis(hydroxymethyl)phosphonium chloride. The term tetrakis(hydroxymethyl)phosphonium hydroxide or THPOH refers to a solution prepared by neutralizing any tetrakis(hydroxymethyl)phosphonium salt with any suitable base, inorganic or organic, such as sodium hydroxide or triethanolamine.

Copending application filed of even date, Ser. No. 499,807 filed Aug. 22, 1974 relates to the production and use of soluble adduct polymers and to the use of these polymers with certain nitrogenous compounds for the treatment of organic fibrous materials in either a heat cure or chemical cure procedure for the production of flame-resistant organic fibrous textiles.

Copending application filed of even date, Ser. No. 499,806 filed Aug. 22, 1974 relates to the product of adduct polymer solutions and the use of these polymers with phenols, substituted and unsubstituted phenols for the treatment of organic fibrous materials for the production of flame resistant organic fibrous materials. These adduct polymer solutions were prepared by the use of phosphine polymers, formaldehyde, and a hydroxymethyl phosphonium salt.

Copending application filed of even date, Ser. No. 499,803 filed Aug. 22, 1974 relates to the use of adduct polymer solutions and to the use of these solutions with certain nitrogenous compounds for the treatment of organic fibrous materials in either a heat cure or chemical cure procedure for the production of flame resistant organic fibrous textiles. These solutions were prepared by the use of phosphine polymers, formaldehyde, and a hydroxymethyl- phosphonium salt.

A primary object of the present invention is to produce thermosetting flame-resistant polymers and flame-resistant organic fibrous materials.

Polymers of various types can be prepared by reacting tetrakis(hydroxymethyl)phosphonium salts, tris (hydroxymethyl)phosphine or tetrakis(hydroxymethyl)- phosphonium hydroxide with ammonia or diamines such as ethylene diamine and 1,6-hexamethylenediamine or hexamethylenetetramine.

We have discovered that these adduct polymers react with phenol and substituted phenols, including halogenated phenols, which contain one or more hydrogen atoms attached to ring carbons at the ortho or para positions to the phenolic hydroxyl group to produce thermosetting flame-resistant polymers.

More specifically, the products and processes of our invention may be described as follows: (1) Insoluble polymers are prepared by reacting THP (with or without added formaldehyde) with ammonia, diamines, or hexamethylenetetramine or mixtures of these. Insoluble polymers may also be prepared by utilizing tetrakis(hydroxymethyl)phosphonium salts or hydroxide in lieu of THP. The mole ratio may vary from 1:4 to 4:1 of amine to phosphorus compound. The preferred mole ratio is 1:1 with THP and tetrakis(hydroxymethyl)- phosphonium hydroxide and 2:1 with tetrakis(hydroxymethyl)phosphonium chloride. (2) To produce clear solutions of these polymers the polymer is mixed with formalin solution and an acid. The ratio of formaldehyde added to phosphorus contained in the polymer can vary from 1:4 to 4:1. The preferred ratio is 1:1. The ratio of acid added to the phosphorus contained in the polymer can vary from 1:10 to 2:1. The preferred ratio is 1:2. (3) The phenolic or halogen substituted phenolic compound is allowed to react with the adduct polymer to produce thermosetting polymers in accordance with this invention. The reaction is carried out by dissolving the phenolic of halogen substituted phenolic compound in a suitable medium, adding this solution to a solution containing the adduct polymer and then heating as needed until a viscous solution and finally a polymer is produced. Polymers produced by this process are insoluble, thermosetting and flame resistant. (4) To produce flame resistant organic textiles, the textile structure is wetted with a solution containing the adduct polymer and the phenolic or halogenated phenolic compound which contains one or more hydrogens ortho or para to the phenolic hydroxyl group, then drying and heating the textile at a temperature ranging from 90° to 170°C for a period of time necessary to promote copolymerization of the adduct polymer and the phenolic or halogenated phenolic compound within or on the textile structure.

Phenolic compounds suitable for use in making the copolymers of this invention include phenol, o-cresol, m-cresol, p-cresol, catechol, resorcinol, hydroquinone and phloroglucinol. Halogenated phenolic compounds suitable for use in making the copolymers of this invention include o-bromophenol, m-bromophenol, p-bromophenol, o-phenetole, halophenylphenols and haloresorcinols. The primary requirement for the phenolic or halogenated phenolic compound is that it contain at least one hydrogen attached to a ring carbon atom which is ortho or para to the phenolic hydroxyl group. The preferred relative amounts of polymer adduct and phenolic compound used to copolymerize can be calculated by assuming one mole of phosphorus which is contained in the adduct polymer reacts with one mole of the phenolic compound. Polymers produced in accordance with this invention contain phosphorus in the trivalent state and this atom can be oxidized with oxidants such as peroxides, perborates and peracids to the phosphine oxide (pentavalent state).

Suitable solvents for preparing solutions of the phenolic or halogenated phenolic compounds include water, methanol, ethanol, isopropanol and mixtures of these compounds.

Virtually any fibrous organic product capable of being impregnated with the soluble adduct can be made flame resistant by use of this invention. Textiles suitable for use in this invention are woven, knit, or nonwoven structures. For best results, the textile structure should contain at least about 25% of a cellulosic fiber. Cellulosic fibers suitable for use in this invention include, cotton, rayon, ramie, flax, and the like fibers. Various noncellulosic natural fibers can also be used in this invention, such as wool and mohair. Noncellulosic synthetic fibers suitable for use in this invention along with a cellulosic fiber are polyesters, nylons, acrylics, polyvinylchloride, and the like fibers. When cellulosic fibers are blended with flammable noncellulosic fibers it is preferable to have about 50% or more cellulosic fiber in the blend structure.

The following examples illustrate but do not limit the scope of this invention.

EXAMPLE 1

The polymers were prepared by reacting the appropriate phosphorus compound with the amine or diamine as described in Table I. All of the polymers were filtered from the mother liquor, washed with water, ethanol and methanol before leaving to air dry for eight days. The polymers were then bottled and used to prepare the adduct polymers. In Table II the preparation of the adduct polymer from formaldehyde, acid and polymer are described. The adduct polymers were then mixed with the phenolic or halogenated phenolic compound in an appropriate solvent as described in Table III. These solutions were used to (a) prepare thermosetting polymers and (b) produce flame-resistant organic fibrous materials. Aliquots of the copolymer solutions were heated from about 120°–150°C to produce thermosetting polymers which are described in Table IV. To produce flame-resistant organic fibrous materials, the textile structures were impregnated with the solutions described in Table III, then heated to produce insoluble polymers in or on the fibrous structure. In Table V are shown the fibrous materials treated, the solutions of Table III used to treat the fibrous material and a brief description of the product.

TABLE I

| Polymer No. | Phosphine Polymers Reactants | % P in Polymer |
|---|---|---|
| 1 | 1500g. 40% THPOH (Thpc neutralized with sodium hydroxide); 205g. ammonium hydroxide (29% ammonia) | 31.8 |
| 2 | 238g. Thpc (80%); 238 g Water; 175g ammonium hydroxide (29% ammonia) | 23.4 |
| 3 | 160g. THP (80%); 200g water; 105g Hexamethylenetetramine | 29.9 |
| 4 | 430g. 40% THPOH (Thpc neutralized with sodium hydroxide);105g. hexamethylenetetramine | 35.4 |
| 5 | 573g. 40% THPOH (Thpc neutralized with sodium hydroxide); 61.2g. ethylenediamine (98%) | 29.5 |
| 6 | 573g 40% THPOH (Thpc neutralized with sodium hydroxide); 162g. 1,6-hexamethylene diamine (70%) | 21.5 |

TABLE II

| Designation of Adduct Polymer Solution | Soluble Adduct Polymers Reactants | Time Required for Complete Solution |
|---|---|---|
| A | 120g Polymer No. 1; 30g Acetic Acid; 74.4g Formalin (37.5%); 75.6g water | 4 hours |
| B | 40g. Polymer No. 2; 24.2g Formalin (37.5%); 10.3g Phosphoric acid ($H_3PO_4$) (85%); 25.5g water | 4 hours |
| C | 40g Polymer No. 3; 30.8g. formalin (37.5%); 19.2g hydrochloric acid (HCl) (37%); 10g water | 4 hours |
| D | 43.8g Polymer No. 4; 11.2g oxalic acid; 40g formalin (37.5%); 14.5g water | 4 hours |
| E | 40g polymer No. 5; 10g acetic acid; 25g formalin (37.5%); 25g water | 24 hours |
| F | 40g. polymer No. 6; 10g Phosphoric Acid ($H_3PO_4$) 25g formalin (37.5%); 65g water | 100 hours |

TABLE III

| Designation of Copolymer Solution | Copolymer Solutions Composition of Solution |
|---|---|
| G | 20g of Soln. A; 6g water; 10g ethanol; 4g phenol |
| H | 20g of Soln. A; 6g water, 10g ethanol; 4g m-bromophenol |
| I | 25g of Soln. C; 10g water, 10g ethanol; 5g bromo-hydroquinone |
| J | 25g of Soln. D; 10g water, 10g ethanol; 5g phenol |
| K | 25g of Soln E; 20g ethanol; 5g metabromophenol |

TABLE IV

Production of Flame Resistant Thermosetting Polymers Through Use of Adduct Polymers and Phenols

| Copolymer Solution Used (Designation from Table III) | Description of Thermosetting Polymer Resulting From Heating the Copolymer Solution from about 120–150°C for about 1–10 minutes |
|---|---|
| G | Clear yellow, hard polymer, insoluble in water and ethanol. Flame and glow resistant. Contains nitrogen and phosphorus. |
| H | Clear yellow, hard polymer, insoluble in water and ethanol. Flame and glow resistant. Contains nitrogen and phosphorus. |
| I | Clear yellow hard polymer, insoluble in water and ethanol. Flame and glow resistant. Contains nitrogen and phosphorus |
| J | Clear yellow hard polymer, insoluble in water and ethanol. Flame and glow resistant. |

TABLE IV-continued

Production of Flame Resistant Thermosetting Polymers
Through Use of Adduct Polymers and Phenols

| Copolymer Solution Used (Designation from Table III) | Description of Thermosetting Polymer Resulting From Heating the Copolymer Solution from about 120–150°C for about 1–10 minutes |
|---|---|
| K | Contains nitrogen and phosphorus. Clear gold hard polymer, insoluble in water and ethanol. Flame and glow resistant. Contains nitrogen and phosphorus. |

TABLE V

Preparation of Flame Resistant Organic Fibrous Materials

| Fabric Treated | Adduct or Copolymer Solution Applied to Fabric | Conditions for Depositing Insoluble Polymer in Fabric | Approximate Add-on of Retardant After Washing the Treated Textile | Properties of Treated Fabric | | | |
|---|---|---|---|---|---|---|---|
| | | | | Hand | Strength | Color | Match Test Angle |
| Cotton Printcloth | G | 150°C 2 min | 6 | Crisp | Good | White | 90° |
| PE/cotton Blend fabric 50/50 | G | " | 7 | Good | Good | White | 45° |
| Cotton Printcloth | H | " | 19 | Crisp | Good | Yellow | 135° |
| PE/Cotton Blend Fabric 50/50 | H | " | 35 | Crisp | Good | Yellow | 180° |
| Cotton Printcloth | I | " | 2 | Good | Good | White | 45° |
| Cotton Sateen | J | " | 8 | Good | Good | White | 90° |
| PE/cotton Blend fabric 50/50 | K | " | 10 | Good | Good | Yellow | 110° |

We claim:

1. A process for flameproofing organic textiles comprising:

a. reacting a hydroxymethyl phosphorus compound with a nitrogenous compound to form an insoluble polymeric precipitate,
   b. dissolving the precipitate from (a) in the presence of formaldehyde and an inorganic or organic acid with a mole ratio of 1:4 to 4:1 of formaldehyde to phosphorus contained in the precipitate and a 1:10 to 2:1 ratio of acid to phosphorus contained in the precipitate,
   c. reacting the soluble polymer adduct from (b) with a phenolic type compound containing one or more hydrogens ortho or para to the phenolic hydroxyl group,
   d. wetting a textile fabric with a solution of (c), and
   e. drying the wetting fabric from (d) at a temperature from about 90°–170°C.

2. The product produced by the process of claim 1.

* * * * *